US011924500B2

(12) United States Patent
Jia

(10) Patent No.: US 11,924,500 B2
(45) Date of Patent: Mar. 5, 2024

(54) INFORMATION INTERACTION METHOD AND DEVICE, ELECTRONIC APPARATUS, AND COMPUTER READABLE STORAGE MEDIUM

(71) Applicant: BEIJING BYTEDANCE NETWORK TECHNOLOGY CO., LTD., Beijing (CN)

(72) Inventor: Li Jia, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/358,533

(22) Filed: Jun. 25, 2021

(65) Prior Publication Data

US 2021/0400330 A1 Dec. 23, 2021

Related U.S. Application Data

(63) Continuation of application No. PCT/CN2019/110064, filed on Oct. 9, 2019.

(30) Foreign Application Priority Data

Dec. 26, 2018 (CN) .......................... 201811596498.7

(51) Int. Cl.
*H04N 21/431* (2011.01)
*H04N 21/45* (2011.01)
*H04N 21/482* (2011.01)

(52) U.S. Cl.
CPC ....... *H04N 21/431* (2013.01); *H04N 21/4532* (2013.01); *H04N 21/482* (2013.01)

(58) Field of Classification Search
CPC ............ H04N 21/431; H04N 21/4532; H04N 21/482; H04N 21/478; H04N 21/4316
See application file for complete search history.

(56) References Cited

U.S. PATENT DOCUMENTS

2002/0042920 A1* 4/2002 Thomas ............. H04N 21/4751
348/E7.071
2008/0295129 A1* 11/2008 Laut ....................... G06Q 30/02
725/34

(Continued)

FOREIGN PATENT DOCUMENTS

CN 103945234 A 7/2014
CN 104168491 A1 11/2014

(Continued)

OTHER PUBLICATIONS

International Patent Application No. PCT/CN2019/110064; Int'l Search Report, dated Dec. 31, 2019; 3 pages.

(Continued)

*Primary Examiner* — Michael R Telan
(74) *Attorney, Agent, or Firm* — BakerHostetler

(57) ABSTRACT

Provided are an information interaction method, an information interaction device, an electronic apparatus, and a computer readable storage medium. In the information interaction method, a first interaction interface is displayed in a case that a first video is played in a state meeting a first predetermined condition, where the first interaction interface includes a first number of interaction items. A second interaction interface is displayed in a case that the first video (Continued)

is played in a state meeting a second predetermined condition, where the second interaction interface includes a second number of interaction items. The first number is less than or equal to the second number.

18 Claims, 4 Drawing Sheets

(56) References Cited

U.S. PATENT DOCUMENTS

| | | | |
|---|---|---|---|
| 2009/0216745 A1* | 8/2009 | Allard | H04N 21/4126 |
| 2009/0293080 A1* | 11/2009 | Ramanathan | H04H 60/73 |
| | | | 725/20 |
| 2012/0030050 A1* | 2/2012 | Rey | H04N 21/4882 |
| | | | 705/26.1 |
| 2012/0204209 A1* | 8/2012 | Kubo | H04N 21/4622 |
| | | | 725/34 |
| 2013/0339990 A1* | 12/2013 | Ohwa | H04N 21/8352 |
| | | | 725/14 |
| 2015/0074703 A1 | 3/2015 | Cremer et al. | |
| 2016/0156983 A1 | 6/2016 | Vong et al. | |
| 2016/0239198 A1 | 8/2016 | Shenkler | |
| 2017/0013315 A1 | 1/2017 | Oztaskent et al. | |
| 2018/0139405 A1* | 5/2018 | Baek | H04N 21/42204 |
| 2018/0152767 A1 | 5/2018 | Liu et al. | |
| 2018/0220194 A1 | 8/2018 | Chai et al. | |

FOREIGN PATENT DOCUMENTS

| | | |
|---|---|---|
| CN | 104954879 A | 9/2015 |
| CN | 105530548 A | 4/2016 |
| CN | 105847861 A | 8/2016 |
| CN | 106572378 A | 4/2017 |
| CN | 107454465 A | 12/2017 |
| CN | 107786903 A | 3/2018 |
| CN | 107995515 A | 5/2018 |
| CN | 108366278 A | 8/2018 |
| CN | 108696765 A | 10/2018 |
| CN | 109714626 A | 5/2019 |

OTHER PUBLICATIONS

Huan et al.; "The use of bullet video in MOOC learning"; The Chinese Journal of ICT in Education; Sep. 2016; p. 84-87 (contains English Translation).

European Patent Application No. 19904732.5; Extended Search Report, dated Jan. 21, 2022; 8 pages.

* cited by examiner

INFORMATION INTERACTION METHOD AND DEVICE, ELECTRONIC APPARATUS, AND COMPUTER READABLE STORAGE MEDIUM

REFERENCE TO RELATED APPLICATION

The present application is a continuation application of International Patent Application No. PCT/CN2019/110064, titled "INFORMATION INTERACTION METHOD AND DEVICE, ELECTRONIC APPARATUS, AND COMPUTER READABLE STORAGE MEDIUM", filed on Oct. 9, 2019, which claims priority to Chinese Patent Application No. 201811596498.7, titled "INFORMATION INTERACTION METHOD AND DEVICE, ELECTRONIC APPARATUS, AND COMPUTER READABLE STORAGE MEDIUM", filed on Dec. 26, 2018, both of which are incorporated herein by reference in their entireties.

FIELD

The present disclosure relates to the field of information processing, and in particular to an information interaction method, an information interaction device, an electronic apparatus, and a computer readable storage medium.

BACKGROUND

With the progress of Internet-related technologies, video applications become main means of interaction. For example, video providers or video platform service providers can acquire user traffic and user data through the video applications, and users can acquire desired information through the video applications.

In conventional technologies, when a user plays a video by means of a video application, a video provider or a video platform service provider may provide the user with other information through an interaction interface. For example, when the user triggers play of the video, other information is played for the user before the video is played. The information is usually configured in advance by the video provider or the video platform service provider. Therefore the information has no relation with the play of the video. The user has to passively receive the interaction information, resulting in a poor user experience.

SUMMARY

An information interaction method, an information interaction device, an electronic apparatus, and a computer readable storage medium are provided according to the present disclosure to provide the user with interaction information based on a state of playing the video by the user, so as to improve a user experience and meet user demands.

According to a first aspect of the embodiments of the present disclosure, an information interaction method is provided. The information interaction method includes: displaying a first interaction interface in a case that a first video is played in a state meeting a first predetermined condition, where the first interaction interface includes a first number of interaction items; and displaying a second interaction interface in a case that the first video is played in a state meeting a second predetermined condition, where the second interaction interface includes a second number of interaction items. The first number is less than or equal to the second number.

Further, the interaction item includes; an interaction item for inputting and/or displaying knowledge; an interaction item for inputting and/or displaying question and answer information; an interaction item for inputting and/or displaying contact means; an interaction item for inputting and/or displaying a contact person; an interaction item for inputting and/or displaying a contact time; an interaction item for inputting and/or displaying a contact address, and/or an interaction item for displaying a second video.

Further, a display area of the first interaction interface is less than or equal to a display area of the second interaction interface.

Further, the first predetermined condition includes one or more of: the first video is played for a first predetermined period of time; the first video is played to a first predetermined video frame of the first video; the first video is played to a first predetermined time instant of the first video; and the first video is repeatedly played for a first repetition number of times.

Further, the second predetermined condition includes one or more of: the first video is played for a second predetermined period of time; the first video is played to a second predetermined video frame of the first video; the first video is played to a second predetermined time instant of the first video; and the first video is repeatedly played for a second repetition number of times.

Further, a style and/or a content of the first interaction interface are associated with the first video.

Further, the style and/or the content of the first interaction interface are associated with a user profile corresponding to the first video.

Further, a style and/or a content of the second interaction interface are associated with the first video.

Further, the style and/or the content of the second interaction interface are associated with a user profile corresponding to the first video.

According to a second aspect of the embodiments of the present disclosure, an information interaction device is provided. The information interaction device includes a first display module and a second display module. The first display module is configured to display a first interaction interface in a case that a first video is played in a state meeting a first predetermined condition. The first interaction interface includes a first number of interaction items. The second display module is configured to display a second interaction interface in a case that the first video is played in a state meeting a second predetermined condition. The second interaction interface includes a second number of interaction items. The first number is less than or equal to the second number.

Further, the interaction item includes: an interaction item for inputting and/or displaying knowledge; an interaction item for inputting and/or displaying question and answer information; an interaction item for inputting and/or displaying contact means; an interaction item for inputting and/or displaying a contact person; an interaction item for inputting and/or displaying a contact time; an interaction item for inputting and/or displaying a contact address; and/or an interaction item for displaying a second video.

Further, a display area of the first interaction interface is less than or equal to a display area of the second interaction interface.

Further, the first predetermined condition includes one or more of: the first video is played for a first predetermined period of time; the first video is played to a first predetermined video frame of the first video; the first video is played to a first predetermined time instant of the first video; and the first video is repeatedly played for a first repetition number of times.

Further, the second predetermined condition includes one or more of: the first video is played for a second predetermined period of time; the first video is played to a second predetermined video frame of the first video; the first video is played to a second predetermined time instant of the first video; and the first video is repeatedly played for a second repetition number of times.

Further, a style and/or a content of the first interaction interface are associated with the first video.

Further, the style and/or the content of the first interaction interface are associated with a user profile corresponding to the first video.

Further, a style and/or a content of the second interaction interface are associated with the first video.

Further, the style and/or the content of the second interaction interface are associated with a user profile corresponding to the first video.

According to a third aspect of the embodiments of the present disclosure, an electronic apparatus is provided. The electronic apparatus includes a memory and one or more processors. The memory is configured to store computer readable instructions. The processor is configured to execute the computer readable instructions to perform any one of the information interaction methods according to the first aspect.

According to a fourth aspect of the embodiments of the present disclosure, a non-transient computer readable storage media is provided. The non-transient computer readable storage media stores computer readable instructions that when being executed by a computer, cause the computer to perform any one of the information interaction methods according to the first aspect.

An information interaction method, an information interaction device, an electronic apparatus, and a computer readable storage medium are provided according to the present disclosure. The information interaction method includes: displaying a first interaction interface in a case that a first video is played in a state meeting a first predetermined condition, where the first interaction interface includes a first number of interaction items; and displaying a second interaction interface in a case that the first video is played in a state meeting a second predetermined condition, where the second interaction interface includes a second number of interaction items. The first number is less than or equal to the second number. In the embodiments of the present disclosure, interaction information is provided for the user based on a state of playing the video by the user, which improves user experience and meets user demands.

The above description is merely an overview of technical solutions of the present disclosure. In order to make technical means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

In order to clearly describe the technical solutions in the embodiments of the present disclosure or the technical solutions in the conventional technologies, drawings to be used in the description of the embodiments of the present disclosure or the conventional technologies are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

Embodiments of the present disclosure are described with specific examples hereinafter. Those skilled in the art may easily learn about other advantages and effects of the present disclosure from details disclosed in the present specification. Apparently, embodiments described below are merely some embodiments of the present disclosure rather than all embodiments of the present disclosure. The present disclosure may be implemented or applied in other different embodiments. Details of the present specification may be modified or changed based on different viewpoints and applications without departing from the spirit of the present disclosure. It should be noted that embodiments below and features in the embodiments may be combined with each other if there is no conflict. Any other embodiments obtained by those skilled in the art based on the embodiments in the present disclosure without any creative effort fall within the protection scope of the present disclosure.

It should be noted that, various aspects of embodiments in the scope of the attached claims are described below. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, apparatuses and/or methods may be implemented by using any number of aspects of the present specification. In addition, other structures and/or functions than one or more aspects of the present disclosure may be used to implement the apparatus and/or method.

It should be noted that, the drawings provided in the following embodiments are merely used to schematically explain basic idea of the present disclosure. The drawings only show elements relating to the present disclosure and are not drawn according to actual number, shape and size of the elements. The shape, number and scale of each element in practical implementations may be changed optionally and the configuration of the elements may be more complex.

Moreover, in the following description, specific details are provided for better understanding of the embodiments. However, those skilled in the art should understand that the aspects of the present disclosure may be implemented without the specific details.

Figure 1:
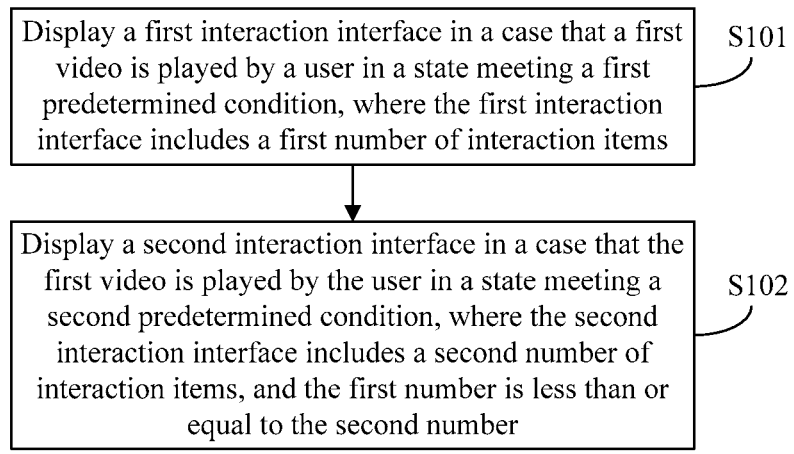
FIG. 1 is a flowchart of an information interaction method according to an embodiment of the present disclosure.

FIG. 1 is a flowchart of an information interaction method according to an embodiment of the present disclosure. The information interaction method according to the embodiment of the present disclosure may be performed by an information interaction device. The information interaction device may be implemented as software, hardware or a combination of software and hardware. The information interaction device may be integrated in a computer apparatus, such as a mobile computer apparatus or a desktop computer apparatus.

An application scenario of the embodiment of the present disclosure, for example, may be a scenario in which a user plays a video by means of a computer apparatus. The video may be provided to the user by a video provider or a video platform service provider through a video server. Alternatively, the video may be stored by the user on the computer apparatus, which is not limited in the embodiments of the present disclosure.

As shown in FIG. 1, the information interaction method according to the embodiments of the present disclosure includes the following steps S101 and S102.

In step S101, a first interaction interface is displayed in response to that a first video is played in a state meeting a first predetermined condition. The first interaction interface includes a first number of interaction items.

In step S102, a second interaction interface is displayed in response to that the first video is played in a state meeting a second predetermined condition. The second interaction interface includes a second number of interaction items.

The first number is less than or equal to the second number.

In the embodiments of the present disclosure, the interaction interface is displayed by the computer apparatus for information interaction between the user and the computer apparatus. The interaction interface includes one or more interaction items (interaction controls). The one or more interaction items included in the interaction interface realize the information interaction between the user and the computer apparatus. For example, the interaction interface includes an interaction item for displaying information and/ or an interaction item for inputting information. For example, the interaction item occupies a display area on the interaction interface. In an embodiment, the interaction interface displayed by the computer apparatus, the interaction item, and content displayed in the interaction item may be provided by the video provider or the video platform service provider. The information inputted by the user to the computer apparatus may be eventually provided to the video provider or the video platform service provider.

In step S101, in playing the first video by the user, the first interaction interface is displayed in response to that the first video is played by the user in the state meeting the first predetermined condition. The first interaction interface includes a first number of interaction items. For example, the first predetermined condition includes that the first video is played for 5 minutes, and the first interaction interface includes an interaction item for displaying knowledge. Therefore, the first interaction interface is displayed in response to that the first video is played by the user for 5 minutes, and the knowledge displayed by the interaction item included in the first interaction interface is, for example, information related to the first video, including but not limited to a video producer, a video production time, a video content summary, and the like. If the first video is played by the user in the state meeting the first predetermined condition, it usually can be determined that the user has some interest in the first video. In this case, the first interaction interface is displayed to provide the user with interaction information based on the state of playing the video by the user, rather than providing the user with interaction information irrelatively to the state of playing the video by the user.

In step S102, in playing the first video by the user, the second interaction interface is displayed in response to that the first video is played by the user in the state meeting the second predetermined condition. The second interaction interface includes a second number of interaction items. The first number is less than or equal to the second number. For example, the second predetermined condition includes that the first video is played to the last video frame of the first video, which may be considered that the first video is completely played. The second interaction interface includes an interaction item for inputting knowledge and an interaction item for playing a second video, that is, the first number of the interaction items included in the first interaction interface is less than or equal to the second number of the interaction items included in the second interaction interface. The second interaction interface is displayed in response to that the user plays the first video until the last video frame of the first video is played. The interaction item for inputting knowledge included in the second interaction interface is, for example, an interaction item for inputting evaluation of the first video. The interaction item for playing the second video included in the second interaction interface is, for example, an interaction item for playing a behind-the-scenes video of the first video. If the user plays the first video in the state meeting the second predetermined condition, it usually can be determined that the user has a great interest in the first video. In this case, the second interaction interface including a larger number of interaction items is displayed to provide the user with more detailed interaction information based on the state of playing of video by the user, rather than providing the user with interaction information irrelatively to the state of playing the video by the user.

With the information interaction method according to the present disclosure, in playing the first video by the user, the first interaction interface is displayed in response to that the first video is played in the state meeting the first predetermined condition, and the second interaction interface is displayed in response to that the first video is played in the state meeting the second predetermined condition. The second number of the interaction items included in the second interaction interface is greater than or equal to the first number of the interaction items included in the first interaction interface. In this way, interaction information with different detail degrees are provided for the user according to different conditions met by the states of playing the first video by the user, so as to improve the user experience and meet the user demands.

In an embodiment, a display area of the first interaction interface is less than or equal to a display area of the second interaction interface. In other words, the display area of the second interaction interface is greater than or equal to the display area of the first interaction interface. Since the second number of the interaction items included in the second interaction interface is greater than or equal to the first number of the interaction items included in the first interaction interface, the second interaction interface may require a display area larger than that of the first interaction interface to arrange the interaction items displayed on the second interaction interface, so as to obtain a good display effect. Therefore, a display area larger than that of the first interaction interface may be configured for the second interaction interface.

Figure 2A:
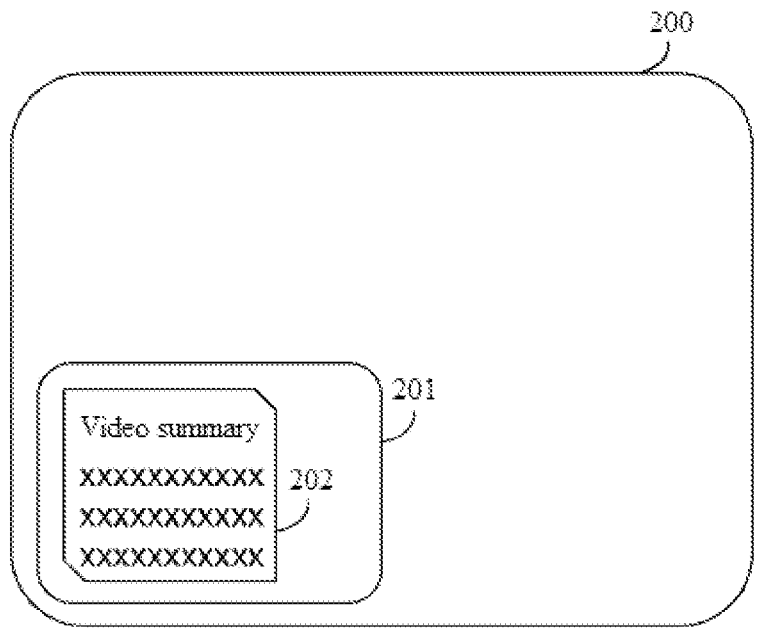
FIG. 2a is a schematic diagram of an interaction interface displayed with the information interaction method according to an embodiment of the present disclosure.
Figure 2B:
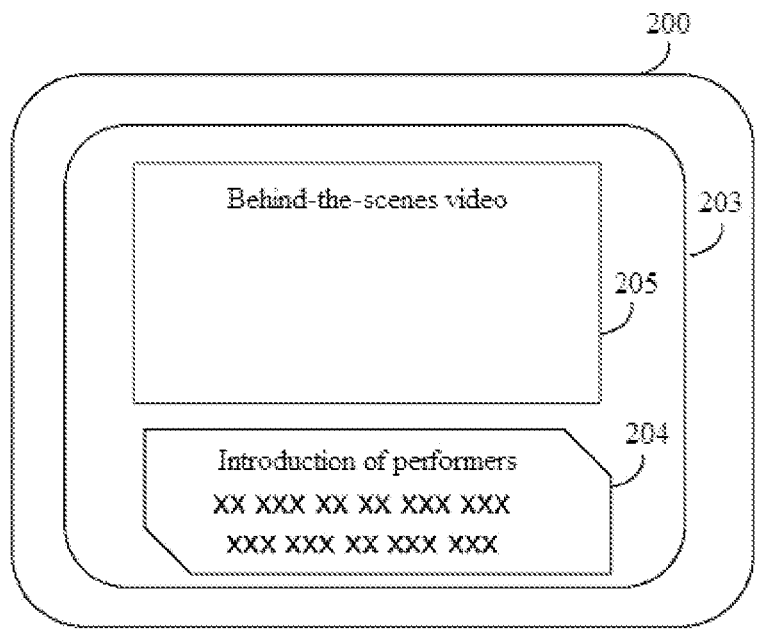
FIG. 2b is a schematic diagram of an interaction interface displayed with the information interaction method according to an embodiment of the present disclosure.

As shown in FIG. 2a, the computer apparatus that plays the first video displays, on a display screen, a play window 200 for playing the first video. The first interaction interface 201 is located at a left bottom of the play window 200 of the first video. The first interaction interface 201 includes an interaction item 202. The interaction item 202 is used for, for example, displaying one or more pieces of knowledge. Apparently, the first interaction interface 201 may also be located at any appropriate position, such as an edge or a corner of the play window 200 of the first video, which is not limited in the embodiments of the present disclosure. In FIG. 2b, the computer apparatus that plays the first video displays, on the display screen, the play window 200 for playing the first video. The second interaction interface 203 completely occupies (or almost completely occupies) the play window 200 of the first video. The second interaction interface 203 includes interaction items 204 and 205. The interaction item 204 is used for, for example, displaying one or more pieces of knowledge. The interaction item 205 is used for playing a second video. It should be noted that the interaction interface (including the first interaction interface and/or the second interaction interface) in the embodiments of the present disclosure may be implemented as an independent window, that is, the interaction interface may be implemented as a window different from the play window for playing the first video. In this case, the interaction interface can be closed independently, without closing the play window for playing the first video. Alternatively, the interaction interface in the embodiments of the present disclosure may be displayed through the play window for displaying the first video. For example, the interaction interface is displayed using pixels in a video frame displayed in the play window of the first video, which is not limited in the embodiments of the present disclosure.

The first predetermined condition in the embodiment includes but is not limited to one or more of the following conditions: the first video is played for a first predetermined period of time; the first video is played to a first predetermined video frame of the first video; the first video is played to a first predetermined time instant of the first video; and the first video is repeatedly played for a first repetition number of times. The first interaction interface is displayed in response to that the first video is played in the state meeting the first predetermined condition.

In a case that the first predetermined condition includes that the first video is played for the first predetermined period of time, in the information interaction method according to the embodiments of the present disclosure, a period of time spent on playing the first video is accumulated. For example, a period of time spent on playing the first video, no matter in the normal manner, faster forward manner, the fast rewind manner or the like, are accumulated. When an accumulated period of time reaches the first predetermined period of time, the first interaction interface is displayed.

In a case that the first predetermined condition includes that the first video is played to the first predetermined video frame of the first video, in the information interaction method according to the embodiments of the present disclosure, the first predetermined video frame is detected. When it is detected that the first predetermined video frame is being played, or the first predetermined video frame is to be played (the first predetermined video frame is about to be played or a next video frame to be played is the first predetermined video frame), or the first predetermined video frame has been played, the first interaction interface is displayed. The first predetermined video frame includes one video frame or multiple video frames. For example, in a case that the first predetermined video frame includes multiple video frames, the condition that the first video is played to the first predetermined video frame of the first video includes: any one of the multiple video frames is being played, to be played, or has been played.

In a case that the first predetermined condition includes that the first video is played to the first predetermined time instant of the first video, in the information interaction method according to the embodiments of the present disclosure, it is detected whether the first video is played to the first predetermined time instant of the first video. The first interaction interface is displayed in response to that the first video is played to the first predetermined time instant of the first video.

In a case that the first predetermined condition includes that the first video is repeatedly played for the first repetition number of times, in the information interaction method according to the embodiments of the present disclosure, the number of times of repeated playing of the first video is detected. For example, each time when the last video frame of the first video is played, the number of times of repeated playing the first video is increased by one. When the number of times of repeated playing the first video reaches the first repetition number of times, the first interaction interface is displayed.

The second predetermined condition in the embodiment includes but is not limited to one or more of the following conditions: the first video is played for a second predetermined period of time; the first video is played to a second predetermined video frame of the first video; the first video is played to a second predetermined time instant of the first video; the first video is repeatedly played for a second repetition number of times. The description of the second predetermined condition is same or similar to the description of the first predetermined condition, which is not repeated herein. The second interaction interface is displayed in response to that the first video is played in the state meeting the second predetermined condition.

For example, the first predetermined condition includes that the first video is played for a first predetermined period of time, and the second predetermined condition includes that the first video is repeatedly played for a second repetition number of times, where the second repetition number is equal to two. In this case, when the user plays the first video for the first predetermined period of time, which means that the user is interested in the first video, the first interaction interface is displayed. Then, the user continues to play the first video. When the user repeatedly plays the first video twice, which means that the user is very interested in the first video, the second interaction interface is displayed. The number of interaction items included in the second interaction interface is greater than or equal to the number of interaction items included in the first interaction interface. It can be understood that the first predetermined condition may include one or more of the above conditions, and the second predetermined condition may include one or more of the above conditions. For example, the first predetermined condition includes that the first video is played for the first predetermined period of time and that the first video is played to the first predetermined video frame of the first video. In this case, the first interaction interface is displayed only when the above two conditions are both met. With the above method, information with different detail degrees are provided for the user according to different conditions met by the states of playing the first video by the user, so as to improve the user experience and meet the user demands.

In an embodiment, a style and/or a content of the first interaction interface are associated with the first video. It can be understood that in the embodiments of the present disclosure, since the interaction interface expresses a style and content through an interaction item, the style and content of the interaction interface may be understood as a style and content of the interaction item included in the interaction interface. In an embodiment in which the style of the first interaction interface are associated with the first video, for example, videos in a video pool may be classified and styles in a style pool of the first interaction interface may be classified. A classification of the first video is acquired when the user plays the first video, and then a classification of the style of the first interaction interface corresponding to the classification of the first video is determined based on the correspondence between the classification of style of the first interaction interface and the classification of the first video. The first interaction interface is displayed based on the determined classification of the style of the first interaction interface. For example, if the first video played by the user belongs to a cartoon classification, it is determined, based on the correspondence, that the first interaction interface corresponding to the video belonging to the cartoon classification should be displayed in a cartoon style. The first interaction interface with a cartoon style is consistent with the first video in form, which improves user experience. For another example, if the first video played by the user belongs to a product introduction classification, it is determined, based on the correspondence, that the first interaction interface corresponding to the video belonging to the product introduction classification should be displayed in a product style. The first interaction interface in the product style includes a specific interaction item, for example, the first interaction interface includes an interaction item for inputting contact means, so that a product introducer provides the user with detailed information about the product by the contact means after the user inputs the contact means. In an embodiment in which the content of the first interaction interface is associated with the first video, for example, when playing the first video, the user usually desires to know content associated with the content of the first video, such as a production background of the video, a summary of the video, information on an object that appears in the video, such as an actor, a product, and a scene in the video. Therefore, the above content associated with the first video may be displayed on the first interaction interface through the interaction item.

In another embodiment, the style and/or the content of the first interaction interface are associated with a user profile corresponding to the first video. For example, a user profile may be maintained for the user to determine the style and/or the content of the first interaction interface based on the user profile, so as to display the first interaction interface based on the determined style and/or content. For example, a video server maintains a user profile based on a video play history of the user while providing a video play service for the user. In a case that the user profile of the user playing the first video includes a label of "traveler", the displayed first interaction interface includes an interaction item for displaying knowledge, and the interaction item is used for displaying knowledge about a travel destination associated with the first video, which brings convenience to the user. In a case that the user profile of the user playing the first video includes a label of "shopper", the displayed first interaction interface includes an interaction item for displaying knowledge and an interaction item for inputting contact means. The interaction item for displaying knowledge displays knowledge relevant to a product associated with the first video. The interaction project for inputting contact means is used for providing the user with information relevant to the product by the contact means inputted by the user.

In an embodiment, a style and/or a content of the second interaction interface are associated with the first video. In another embodiment, the style and/or the content of the second interaction interface are associated with the user profile corresponding to the first video. The description of the style and/or the content of the second interaction interface is similar to that of the first interaction interface, which is not repeated herein.

The interaction item according to the embodiments of the present disclosure includes but is not limited to the following nine interaction items.

1. Interaction item for inputting and/or displaying knowledge

It should be noted that a concept of the knowledge should be understood in a broad sense. For example, the knowledge may be understood as meaningful information expressed through a text or an image. For example, if the played first video is a movie, the interaction item for inputting and/or displaying knowledge may be used for inputting and/or displaying a film review. For another example, if the played first video is a documentary film of a scenic spot, the interaction item for inputting and/or displaying knowledge may be used for inputting and/or displaying a travel guide for the scenic spot.

2. Interaction item for inputting and/or displaying question and answer information For example, the interaction item for inputting and/or displaying question and answer information may be used for displaying multiple options for evaluating the played first video, and the user may input an evaluation for the first video by selecting one or more of the multiple options.

3. Interaction item for inputting and/or displaying contact means

4. Interaction item for inputting and/or displaying a contact person

5. Interaction item for inputting and/or displaying a contact time

6. Interaction item for inputting and/or displaying a contact address

For example, the interaction item for inputting and/or displaying a contact address is used for inputting and/or displaying an e-mail address. After inputting an e-mail address of the user, the user receives information associated with the played first video. The user may send an email to the displayed e-mail address to request the information associated with the first video.

7. Interaction item for displaying a second video

For example, if the played first video is a movie or a teleplay, the interaction item for playing a second video may be used for playing a behind-the-scenes video of the movie or the teleplay. For another example, the interaction item for playing a second video may be used for playing a video similar to the first video.

8. An interaction control item for closing the interaction interface

For example, the interaction control item for closing the interaction interface includes a button. When the user clicks the button through an input apparatus, the interaction interface is closed.

9. An interaction control item for sending a message

For example, the interaction control item for sending a message includes a button. When the user clicks the button through an input apparatus, information inputted by the user through the interaction interface is eventually sent to a video provider, a video platform provider or the like, through a network.

It can be understood that the first interaction interface may include one or more of the above interaction items, and the second interaction interface may include one or more of the above interaction items. The number of interaction items included in the first interaction interface and the number of interaction items included in the second interaction interface are not limited in the embodiments of the present disclosure.

Figure 3:
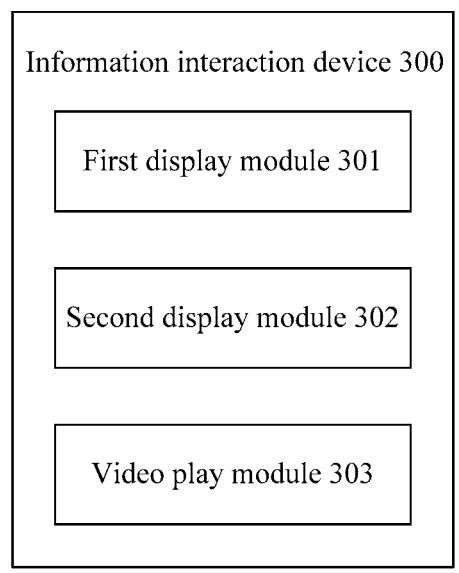
FIG. 3 is a schematic structural diagram of an information interaction device according to an embodiment of the present disclosure.

FIG. 3 is a schematic structural diagram of an information interaction device 300 according to an embodiment of the present disclosure. As shown in FIG. 3, the device includes a first display module 301 and a second display module 302.

The first display module 301 is configured to display a first interaction interface in a case that a first video is played in a state meeting a first predetermined condition. The first interaction interface includes a first number of interaction items.

The second display module 302 is configured to display a second interaction interface in a case that the first video is played in a state meeting a second predetermined condition. The second interaction interface includes a second number of interaction items.

The first number is less than or equal to the second number.

In an embodiment, the information interaction device 300 further includes a video play module 303. The video play module is configured to play the first video.

The device shown in FIG. 3 performs the method according to the embodiment shown in FIG. 1. For content not described in detail in this embodiment, one may refer to relevant descriptions of the embodiment shown in FIG. 1. For implementation and technical effects of the technical solution, one may refer to descriptions of the embodiment shown in FIG. 1, and are not repeated herein.

Figure 4:
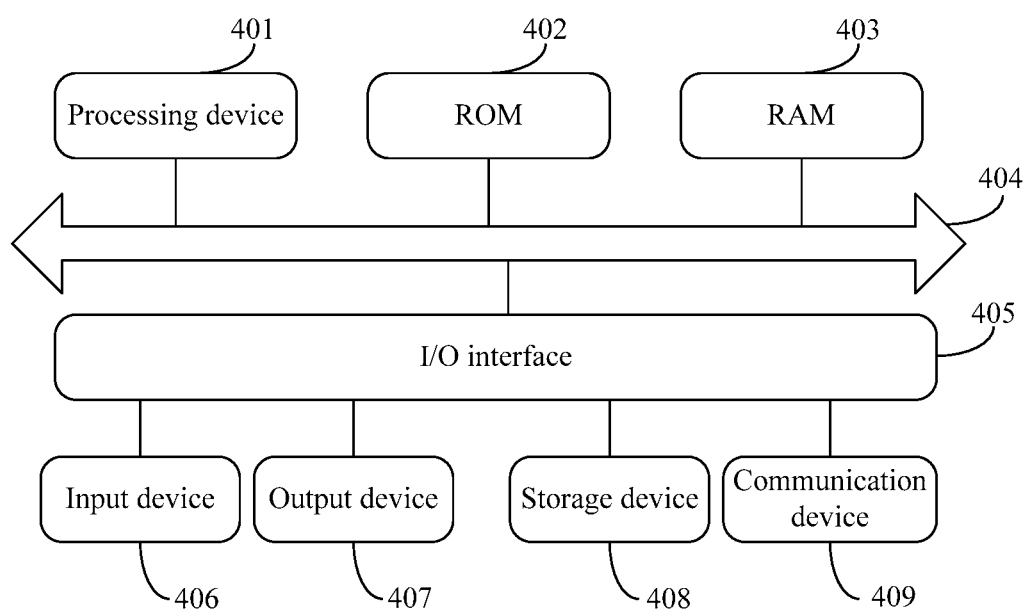
FIG. 4 is a schematic structural diagram of an electronic apparatus according to an embodiment of the present disclosure.

FIG. 4 is a schematic structural diagram of an electronic apparatus 400 applicable for implementing the embodiments of the present disclosure. The electronic apparatus according to the embodiment of the present disclosure may include but is not limited to a mobile terminal such as a mobile phone, a laptop computer, a digital broadcast receiver, a PDA (personal digital assistant), a PAD (tablet computer), a PMP (portable multimedia player) and a vehicle terminal (for example, a vehicle navigation terminal), and a fixed terminal such as a digital TV and a desktop computer. The electronic apparatus shown in FIG. 4 is only an example and should not impose any limitations on the functions and the scope of use of the embodiments of the present disclosure.

As shown in FIG. 4, the electronic apparatus 400 may include a processing device (for example, a central processing unit, a graphics processing unit and the like) 401. The processing device 401 may perform various proper actions and processing based on a grogram stored in a read-only memory (ROM) 402 or a program loaded from a storage device 408 to a random-access memory (RAM) 403. The RAM 403 further stores various programs and data for an operation of the electronic apparatus 400. The processing device 401, the ROM 402 and the RAM 403 are connected to each other through a bus 404 (or other communication connection line). An input/output (I/O) interface 405 is also connected to the bus 404.

Generally, the following may be connected to the I/O interface 405; an input device 406 such as a touch screen, a touch pad, a keyboard, a mouse, an image sensor, a microphone, an accelerometer, a gyroscope, an output device 407 such as a liquid crystal display (LCD), a speaker, a vibrator, a storage device 408 such as a magnetic tape, a hard disk, and a communication device 409. By the communication device 409, the electronic device 400 may communicate with other devices in a wired or wireless manner to exchange data. Although FIG. 4 shows the electronic apparatus 400 including various devices, it should be understood that not all shown devices are required to be implemented or included. The shown devices may be replaced by other devices, or more or less devices may be included.

According to the embodiments of the present disclosure, the process described above in conjunction with the flowchart may be implemented as a computer software program. For example, the embodiments of the present disclosure include a computer program product. The computer program product includes a computer program stored in a computer readable medium. The computer program includes program codes for performing the method shown in the flowchart. In such embodiments, the computer program may be downloaded and installed from the network through the communication device 409, installed from the storage device 408, or installed from the ROM 402. The computer program, when being executed by the processing device 401, performs functions defined in the method according to the embodiments of the present disclosure.

It should be noted that the computer readable medium according to the embodiments of the present disclosure may be a computer readable signal medium, a computer readable storage medium or any combination of the computer readable signal medium and the computer readable storage medium. For example, the computer readable storage medium may be, but is not limited to, an electronic, magnetic, optical, electromagnetic, infrared, or semiconductor system, apparatus, or device, or any combination of the above. In addition, the computer readable storage medium may also include but is not limited to: electrical connections having at least one wire, a portable computer disk, a hard disk, a random access memory (RAM), a read only memory (ROM), erasable programmable read-only memory (EPROM or a flash memory), an optical fiber, a portable compact disc read-only memory (CD-ROM), a light storage device, a magnetic storage device, or any suitable combination of the above. In the present disclosure, the computer readable storage medium may be any physical medium including or storing a program. The program may be used by an instruction execution system, an instruction execution apparatus or an instruction execution device or may be used in combination with the instruction execution system, the instruction execution apparatus and the instruction execution device. In the present disclosure, the computer readable signal medium may include a data signal transmitted in a baseband or transmitted as a part of a carrier wave. The data signal carries computer readable program codes. The transmitted data signal may be in a variety of forms including, but not limited to, an electromagnetic signal, an optical signal, or any suitable combination of the above. The computer readable signal medium may also be any other computer readable medium except for the computer readable storage medium. The computer readable medium can send, transmit or transfer programs used by or used in combination with an instruction execution system, an instruction execution apparatus or an instruction execution device. The program codes included in the computer readable medium may be transferred through any proper medium including, but not limited to, an electric wire, an optical cable, RF (Radio Frequency) and any proper combination of the above.

The computer readable medium may be included in the electronic apparatus. Alternatively, the computer readable medium may exist independently and not assembled in the electronic apparatus.

The computer readable medium may carry one or more programs. The one or more programs, when being executed by an electronic apparatus, cause the electronic apparatus to, display a first interaction interface in a case that a first video is played in a state meeting a first predetermined condition, where the first interaction interface includes a first number of interaction items; and display a second interaction interface in a case that the first video is played in a state meeting a second predetermined condition, where the second interaction interface includes a second number of interaction items, and the first number is less than or equal to the second number.

The computer program codes for performing the operations according to the present disclosure may be written in one or more programming languages or a combination of the one or more programming language. The programming language includes an object oriented programming language such as Java, Smalltalk, C++ and a conventional procedural programming language such as "C" programming language or a similar language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some alternative implementations, functions indicated in the blocks may also be performed in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a dedicated hardware-based system for performing a specified function or operation or implemented by a combination of a special hardware and a computer instruction.

Units described in the embodiments of the present disclosure may be implemented through software or hardware. Names of the units do not limit the units in some cases.

The above descriptions are only preferred embodiments of the present disclosure and explanations of the technical principles of the present disclosure. Those skilled in the art should understand that the scope of the present disclosure is not limited to a technical solution formed by combining the above technical features in a specific manner and should cover other technical solutions formed by combining the above technical features or equivalent features of the above technical features in an arbitrary manner without departing from the conception of the present disclosure. For example, the scope of the present disclosure covers a technical solution formed by replacing one of the above features by a technical feature with a similar function as disclosed in (but not limited to) the present disclosure.

The invention claimed is:

1. An information interaction method, comprising:
    determining whether a first video is played by a user in different states based on predetermined conditions, wherein the different states comprise a first state and a second state;
    automatically displaying a first interaction interface in response to determining that the first video is played by the user in the first state, wherein the first interaction interface comprises a first number of interaction items, wherein the first state indicates a first level of the user's interest in the first video, wherein the interaction items in the first interaction interface comprise an item configured to display information about the first video, and wherein a display style of the first interaction interface is determined based on a classification of the first video;
    automatically displaying a second interaction interface in response to determining that the first video is played by the user in the second state, wherein the second interaction interface comprises a second number of interaction items, wherein the second state indicates a second level of the user's interest in the first video, and wherein the interaction items in the second interaction interface comprise at least one of an item configured to enable the user to input evaluation of the first video or an item configured to play a behind-the-scenes video of the first video;
    wherein the first number is less than or equal to the second number;
    wherein the first interaction interface and the second interaction interface comprise different types of interaction items;
    wherein the second level of the user's interest in the first video is greater than the first level of the user's interest in the first video; and
    wherein levels of the user's interest in the first video are indicated based on at least one of determining whether an accumulated period of playing the first video reaches predetermined time periods, determining whether predetermined video frames are detected during playing the first video, determining whether the first video is played to predetermined time points, or determining whether the first video has been repeatedly played for predetermined numbers.

2. The information interaction method according to claim 1, wherein the interaction item comprises:
    an interaction item for inputting and/or displaying knowledge;
    an interaction item for inputting and/or displaying question and answer information;
    an interaction item for inputting and/or displaying contact means;
    an interaction item for inputting and/or displaying a contact person;
    an interaction item for inputting and/or displaying a contact time;
    an interaction item for inputting and/or displaying a contact address; and/or
    an interaction item for displaying a second video.

3. The information interaction method according to claim 1, wherein a display area of the first interaction interface is less than or equal to a display area of the second interaction interface.

4. The information interaction method according to claim 1, wherein the first predetermined condition comprises one or more of:
the first video is played for a first predetermined period of time;
the first video is played to a first predetermined video frame of the first video;
the first video is played to a first predetermined time instant of the first video; and
the first video is repeatedly played for a first repetition number of times.

5. The information interaction method according to claim 1, wherein the second predetermined condition comprises one or more of:
the first video is played for a second predetermined period of time;
the first video is played to a second predetermined video frame of the first video;
the first video is played to a second predetermined time instant of the first video; and
the first video is repeatedly played for a second repetition number of times.

6. The information interaction method according to claim 1, wherein a style and/or a content of the first interaction interface are associated with the first video.

7. The information interaction method according to claim 6, wherein the style and/or the content of the first interaction interface are associated with a user profile corresponding to the first video.

8. The information interaction method according to claim 1, wherein a style and/or a content of the second interaction interface are associated with the first video.

9. The information interaction method according to claim 8, wherein the style and/or the content of the second interaction interface are associated with a user profile corresponding to the first video.

10. An information interaction device, comprising:
at least one processor; and
a memory configured for storing at least one program, wherein when the at least one program is executed by the at least one processor, the at least one processor is caused to perform operations comprising:
determining whether a first video is played by a user in different states based on predetermined conditions, wherein the different states comprise a first state and a second state;
automatically displaying a first interaction interface in response to determining that the first video is played by the user in the first state, wherein the first interaction interface comprises a first number of interaction items, wherein the first state indicates a first level of the user's interest in the first video, wherein the interaction items in the first interaction interface comprise an item configured to display information about the first video, and wherein a display style of the first interaction interface is determined based on a classification of the first video;
automatically displaying a second interaction interface in response to determining that the first video is played by the user in the second state, wherein the second interaction interface comprises a second number of interaction items, wherein the second state indicates a second level of the user's interest in the first video, and
wherein the interaction items in the second interaction interface comprise at least one of an item configured to enable the user to input evaluation of the first video or an item configured to play a behind-the-scenes video of the first video;
wherein the first number is less than or equal to the second number;
wherein the first interaction interface and the second interaction interface comprise different types of interaction items;
wherein the second level of the user's interest in the first video is greater than the first level of the user's interest in the first video; and
wherein levels of the user's interest in the first video are indicated based on at least one of determining whether an accumulated period of playing the first video reaches predetermined time periods, determining whether predetermined video frames are detected during playing the first video, determining whether the first video is played to predetermined time points, or determining whether the first video has been repeatedly played for predetermined numbers.

11. The device according to claim 10, wherein the interaction item comprises:
an interaction item for inputting and/or displaying knowledge;
an interaction item for inputting and/or displaying question and answer information;
an interaction item for inputting and/or displaying contact means;
an interaction item for inputting and/or displaying a contact person;
an interaction item for inputting and/or displaying a contact time;
an interaction item for inputting and/or displaying a contact address; and/or
an interaction item for displaying a second video.

12. The device according to claim 10, wherein a display area of the first interaction interface is less than or equal to a display area of the second interaction interface.

13. The device according to claim 10, wherein the first predetermined condition comprises one or more of:
the first video is played for a first predetermined period of time;
the first video is played to a first predetermined video frame of the first video;
the first video is played to a first predetermined time instant of the first video; and
the first video is repeatedly played for a first repetition number of times.

14. The device according to claim 10, wherein a style and/or a content of the first interaction interface are associated with the first video.

15. The device according to claim 14, wherein the style and/or the content of the first interaction interface are associated with a user profile corresponding to the first video.

16. The device according to claim 10, wherein a style and/or a content of the second interaction interface are associated with the first video.

17. The device according to claim 16, wherein the style and/or the content of the second interaction interface are associated with a user profile corresponding to the first video.

18. A non-transitory computer-readable memory medium on which a computer program is stored, wherein the computer program, when being executed by a processor, implement a method comprising:
- determining whether a first video is played by a user in different states based on predetermined conditions, wherein the different states comprise a first state and a second state;
- automatically displaying a first interaction interface in response to determining that the first video is played by the user in the first state, wherein the first interaction interface comprises a first number of interaction items, wherein the first state indicates a first level of the user's interest in the first video, and wherein the interaction items in the first interaction interface comprise an item configured to display information about the first video, and wherein a display style of the first interaction interface is determined based on a classification of the first video;
- automatically displaying a second interaction interface in response to determining that the first video is played by the user in the second state, wherein the second interaction interface comprises a second number of interaction items, wherein the second state indicates a second level of the user's interest in the first video, and wherein the interaction items in the second interaction interface comprise at least one of an item configured to enable the user to input evaluation of the first video or an item configured to play a behind-the-scenes video of the first video;
- wherein the first number is less than or equal to the second number;
- wherein the first interaction interface and the second interaction interface comprise different types of interaction items;
- wherein the second level of the user's interest in the first video is greater than the first level of the user's interest in the first video; and
- wherein levels of the user's interest in the first video are indicated based on at least one of determining whether an accumulated period of playing the first video reaches predetermined time periods, determining whether predetermined video frames are detected during playing the first video, determining whether the first video is played to predetermined time points, or determining whether the first video has been repeatedly played for predetermined numbers.

* * * * *